US010762059B2

(12) United States Patent
Felts et al.

(10) Patent No.: US 10,762,059 B2
(45) Date of Patent: Sep. 1, 2020

(54) CREATING AND PATCHING BINARY SOFTWARE HOMES USING CONTENT ADDRESSABLE STORAGE

(71) Applicant: Oracle International Corporation, Redwood Shores, CA (US)

(72) Inventors: David Lee Felts, Denville, NJ (US); Vy Nguyen, Pleasanton, CA (US); Steven To, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 153 days.

(21) Appl. No.: 16/040,398

(22) Filed: Jul. 19, 2018

(65) Prior Publication Data

US 2019/0236164 A1 Aug. 1, 2019

Related U.S. Application Data

(60) Provisional application No. 62/624,654, filed on Jan. 31, 2018.

(51) Int. Cl.
*G06F 17/00* (2019.01)
*G06F 16/182* (2019.01)
*G06F 16/84* (2019.01)
*G06F 16/13* (2019.01)
*G06F 16/16* (2019.01)
*G06F 16/901* (2019.01)
*G06F 16/903* (2019.01)

(52) U.S. Cl.
CPC .......... *G06F 16/183* (2019.01); *G06F 16/137* (2019.01); *G06F 16/164* (2019.01); *G06F 16/86* (2019.01); *G06F 16/9017* (2019.01); *G06F 16/90339* (2019.01)

(58) Field of Classification Search
CPC ...... G06F 16/183; G06F 16/164; G06F 16/86; G06F 16/90339; G06F 16/137
USPC .................................................. 707/600–899
See application file for complete search history.

(56) References Cited

U.S. PATENT DOCUMENTS

2009/0024674 A1* 1/2009 Gallagher ............. G06F 40/197

* cited by examiner

*Primary Examiner* — Isaac M Woo
(74) *Attorney, Agent, or Firm* — Invoke

(57) ABSTRACT

Techniques are disclosed herein for creating and patching software homes using content addressable storage. One or more embodiments comprises storing content for a file that is used to run a particular software deployment. The file is associated with a particular directory that includes a link to a first filename. The first filename is generated as a function of the content for the file, such as by applying a hash function. Responsive to receiving updated content a second filename is generated as a function of the updated content. The second filename is different than the first filename. The link included in the particular directory is modified to point to the second filename. After modifying the link included in the particular directory, the updated content for the file is used to run the particular software deployment.

19 Claims, 10 Drawing Sheets

CREATING AND PATCHING BINARY SOFTWARE HOMES USING CONTENT ADDRESSABLE STORAGE

BENEFIT CLAIM; RELATED APPLICATIONS; INCORPORATION BY REFERENCE

This application claims the benefit of U.S. Provisional Patent Application 62/624,654, filed Jan. 31, 2018, which is hereby incorporated by reference.

This application is related to U.S. application Ser. No. 14/660,679, filed Mar. 17, 2015, and U.S. application Ser. No. 14/660,687, filed Mar. 17, 2015, the entire contents for each of which are hereby incorporated by reference.

TECHNICAL FIELD

The present disclosure relates to updating software files. In particular, the present disclosure relates to techniques for efficiently patching software binaries with little to no downtime.

BACKGROUND

A patch is an update to a software resource and generally includes code to be inserted or otherwise added to the code of a software binary. Patches may be deployed for a variety of reasons, such as to address security vulnerabilities, fix bugs, improve usability or performance, or add new features. Patching complex software systems may involve modifying large amounts of data across one or more software files, which may be a time-consuming process that leads to undesired service outages.

One approach to reduce downtime during patching operations is to clone the software system. According to this approach, the software files used to run software deployments are copied to another location. Patch updates may be applied to the cloned files while the deployments continue to run from the software binaries at the original location. The software deployments may then be migrated to run from the patched version of the software at the new location.

While cloning may reduce the downtime compared to in-place patching, cloning requires copying a large amount of data for large-scale systems. Consequently, this approach may significantly increase the storage overhead and amount of resources consumed during patching operations. Additionally, this approach still involves downtime to migrate the software deployments to the new location, which may be unacceptable for mission critical systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
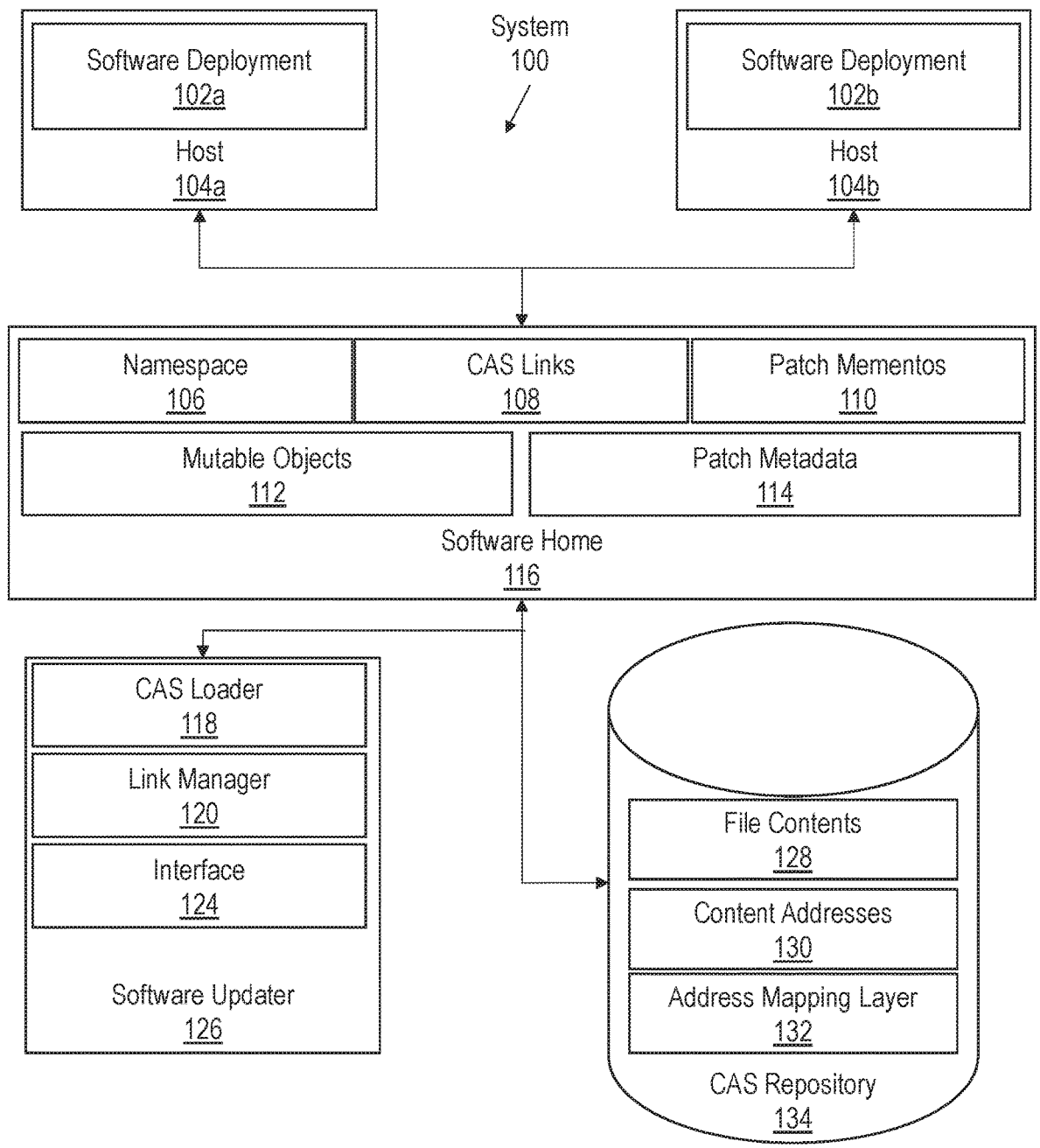
FIG. 1 illustrates a system for creating and patching software homes using content addressable storage in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 PATCH OPERATIONS USING CONTENT ADDRESSABLE STORAGE
   3.1 PHASE ONE: STAGING
   3.2 PHASE TWO: UPDATING THE SOFTWARE HOME
   3.3 GRAFTING NEW DIRECTORY BRANCHES INTO A SOFTWARE HOME
4.0 MEMENTO-BASED OPERATIONS
   4.1 SOFTWARE HOME ROLLBACKS TO PREVIOUS STATES
   4.2 GARBAGE COLLECTION WITHIN CONTENT ADDRESSABLE STORAGE
5.0 ADDITIONAL SOFTWARE HOME CHARACTERISTICS USING CONTENT ADDRESSABLE STORAGE
   5.1 FILE DE-DUPLICATION
   5.2 SOFTWARE HOME VALIDATION AND COMPARISON
6.0 COMPUTER NETWORKS AND CLOUD NETWORKS 7.0 MICROSERVICE APPLICATIONS
8.0 HARDWARE OVERVIEW
9.0 MISCELLANEOUS; EXTENSIONS

1.0 General Overview

Techniques are described herein for creating and patching software homes using content addressable storage. The content addressable storage may be used to separate the contents of a software home from the namespace. A namespace in this context refers to names and associated tree/directory structures through which files in the software home are organized. To provide separation, the file contents are not stored directly in the software home or directly linked to the namespace by physical storage location, such as via the full path filename. Rather, the files are linked to the namespace repository based on the file contents using a content addressable storage (CAS) repository. By separating the namespace of a software home from the contents, new content may be added to the CAS repository without affecting software deployments currently running from the files in the software home. As a result, patching may be performed by software deployments that are actively loading, executing, or otherwise using code from the software home.

Content addressable storage may be implemented by generating a content address (also referred to as a content identifier) for content items added to the CAS repository. An example of a content address is a hashed filename. The system may generate a hashed filename by applying a hash function to individual file content to generate a hash value. The system may then use all or a portion of the hash value as the hashed filename. The content item may be stored in the CAS repository using the hashed filename as the content address, where the hashed filename uniquely identifies the corresponding content within CAS repository. The software home represents files using hard links pointing directly to the content address, effectively creating multiple name-inode mappings. Because the content address is generated based on the file contents, a change to the file contents results in a change in the content address.

During patching operations, updated file contents may be added to the CAS repository. In response, the system generates a new content address for the updated file content, such as by applying a hash function to the updated file contents. The hard links in the namespace may then be replaced or otherwise modified to point to the new content address in the CAS repository. Hard link setup and modification consumes considerably less time and resources than copying files. As a result, patching may be performed with little to no downtime.

One or more embodiments includes maintaining patch mementos that capture different states of a software home at different levels of patching. For example, a patch memento may capture the state of a software home before or after a particular patching operation was performed. Patch mementos may be used to perform various operations including a rollback of the software home to a previous state and garbage collection within the CAS repository.

Providing namespace separation using content addressable storage also allows for optimization in other areas. For example, instead of maintaining multiple copies of a file shared by multiple software homes, a single copy of the file contents may be stored in the CAS repository. Each software home may then store a hard link to the same content address, allowing for de-duplication of data and reduced storage overhead.

Additionally or alternatively, the content addresses of different software homes may be aggregated and compared. For example, a subdirectory within the software home may include hard links, comprising hashed filenames, to one or more files in the CAS repository. The hashed filenames may be aggregated and compared to the aggregated hashed filenames for a subdirectory of another software home. The comparison allows for quick validations of software home and subdirectories contained therein.

One or more embodiments described in this Specification and/or recited in the claims may not be included in this General Overview section.

2.0 System Architecture

FIG. 1 illustrates system 100 for creating and patching software homes using content addressable storage in accordance with one or more embodiments in accordance with one or more embodiments. As illustrated in FIG. 1, system 100 includes software deployments 102*a-b*, hosts 104*a-b*, software home 116, software updater 126 and CAS repository 134. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Software deployments 102*a-b* represent running instances of a software application. In an embodiment, software deployments 102*a-b* may be executed within a runtime environment of a virtual machine. For example, a virtual machine may load software binaries embodying an intermediate representation, such as bytecode, from software home 116 and translate the software binaries into machine code executable by a hardware processor. Additionally or alternatively, machine code may be loaded directly from software binaries associated with software home 116 and executed by a hardware processor on one of hosts 104*a-b*.

Hosts 104*a-b* are configured to execute software deployments 102*a-b*, respectively. Although one software deployment is depicted as executing per host, a host may execute multiple instances/deployments of a software application. In other cases, a software deployment may be a multi-tier or clustered application that is executed across several different servers and/or other host machines. For example, a presentation tier of a software deployment may execute on a web server, an application tier on an application server, and a data tier on a database server. The term "software deployment" as used herein may refer to a software instance executing at a single tier, such as a database instance executing on a database server, or an application comprising software instances executing at multiple tiers. Additionally or alternatively, a host may concurrently execute instances of several different software applications, which may run from the same software home or different software homes.

In one or more embodiments, software deployments 102*a-b* support a cloud service, such as a software-as-a-service (SaaS), platform-as-a-service (PaaS), or database-as-a-service (DBaaS). Example cloud-based architectures are described in further detail in Section 6.0, "Computer Networks and Cloud Networks".

In an embodiment, hosts 104*a-b* are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Software home 116 is a directory or pointer to a directory from which installed software may be run. In one or more embodiments, software home 116 organizes software binaries into functional directories. Accessing software components through functional directories rather than directly through a flat filesystem, such as CAS repository 134, may provide several advantages. In some cases, different directories in software home 116 may be assigned different permissions. One directory may be assigned read only permissions, another may allow reading or writing. Additionally or alternatively, a virtual machine may be restricted from executing code from a particular directory. Additionally or alternatively, different directories may be encrypted and/or password-protected. The different permissions provide security from unauthorized and malicious tampering of software binaries.

Directory structures further facilitate runtime optimizations. For example, predefined class paths may create context for loading and linking software binaries. A virtual machine may be configured to automatically load all software binaries from a certain directory when execution of a particular process begins. Pre-loading allows for more streamlined and efficient execution.

Directory structures may facilitate locating software files based on standard conventions. For example, user-defined scripts may be stored in one directory, system-level scripts in another, and startup scripts in yet another. The separate directories may help users to quickly navigate, find, and access software files of interest. In other cases, virtual machines or other applications may quickly locate software binaries for runtime loading and linking based on predefined conventions.

In one or more embodiments, software home 116 comprises namespace 106, CAS links 108, patch mementos 110, mutable objects 112, and patch metadata 114. Generally, software home 116 may be viewed as a collection of directory inodes containing hard links mapping filenames to CAS repository 134. Stated another way, file references to immutable objects, such as software objects, may be resolved to CAS repository 134.

Namespace 106 is the collection of full path filenames and directories in a software home. A "directory" as used herein may refer to a top-level directory, such as the software home itself, or a subdirectory within the software home. The directory hierarchy may run several levels deep and may be organized/stored in a tree data structure. For example, software home 116 may represent a top-level directory including two or more subdirectories. A subdirectory may also be the parent directory for two or more subdirectories. Additionally or alternatively, a directory may include a set of one or more filenames for files that are included in the subdirectory. The contents for a file that is included in a directory are not physically stored in the directory. The filenames are associated with links to CAS repository 134 where the contents are stored.

In one or more embodiments, filenames within namespace 106 are associated with corresponding CAS links 108. A CAS link in this context is a hard link pointing to a content address that is generated as a function of the file contents. For example, a filename within namespace 106 for a file may be associated with a CAS link that points to a hashed filename for the file, where the hashed filename is derived by applying a hash function to the file contents.

In one or more embodiments, a content address includes a directory and a filename within CAS repository 134. Both the directory and filename may be generated based on the file contents. For example, a hash function may be applied to the file contents to compute a hash key/value. A first portion of the hash value (e.g., the first two bytes), may represent the directory where the file contents are stored. The remaining portion of the hash value may be used to represent the hashed filename. In other cases, the entire hash value may be used for the filename, and the file contents may be stored in a flat directory space. In other cases, the hash value may be further modified to create the filename. Thus, the manner in which the hashed filename is generated may vary depending on the particular implementation.

In one or more embodiments, CAS links 108 are generated using a cryptographic hash function, such as SHA-3 or MD5. A cryptographic hash function is a one-way function that is difficult to invert. In the present context, a cryptographic hash function is used to map the file contents to a hash value, such as a bit string, which serves as the content address. The cryptographic hash function may be used to obfuscate the hard links within the software home. For example, a user may not use the cryptographic hash function to determine the contents of a software binary from the hash value. Additionally, the physical storage location of the file contents may not be readily apparent from the hash value since this value represents a content address and not a location address.

Patch mementos 110 capture the state of software home 116 for different levels of patching. A patch memento may be associated with set of CAS links that capture the state of a particular patch level. For example, a file may initially be linked to one content address in CAS repository 134. After a patching operation, the contents of the file may be updated, resulting in a new content address and corresponding link. The initial link may be preserved in a patch memento to track the previous state of the software home before the patch operation. The patch mementos allow rollback operations to be quickly performed in the event a patching operation causes bugs, errors, or otherwise results in sub-optimal performance.

In one or more embodiments, software home 116 includes mutable objects 112. Mutable objects 112 include data objects that are subject to change during execution of a software instance. For example, mutable objects 112 may include user-generated objects and configuration settings. By comparison, immutable objects may comprise software binaries, the state of which is generally not subject to change during application runtime. Mutable objects 112 may be stored in a location-addressed storage repository as opposed to CAS repository 134. This approach allows CAS repository 134 to operate more efficiently since the frequency with which content addresses need to be generated may be reduced. Also, the software binaries in CAS repository 134 do not need to be modified, even during patching operations, although they may occasionally be deleted through garbage collection.

Software home 116 further includes patch metadata 114, which may also be stored in location-addressed storage similar to mutable objects 112. In one or more embodiments, the namespace for patch metadata is the collection of human-readable attributes such as patch identifiers and branch names. The patch metadata may be read to identify the patch level of software home 116.

In one or more embodiments, CAS repository 134 represents one or more storage units and/or devices that accesses data based on content addresses. CAS repository 134 may be implemented as a single storage unit/device or as multiple different storage units. CAS repository 134 may or may not be of the same type or located at the same physical site. Further, CAS repository 134 may be implemented or may execute on the same computing system as software home and/or software deployments 102a-b. Alternatively or additionally, CAS repository 134 may be implemented or executed on a computing system separate from the other components of system 100. CAS repository 134 may be communicatively coupled to other components of system 100 via a direct connection or via a network.

CAS repository 134 stores files contents 128. In one or more embodiments, files contents 128 includes immutable source objects which are used to run software deployments 102a-b. For example, file contents 128 may include executable software binaries. As previously indicated a software binary may include machine code or may be an intermediate representation. In the former case, the software binary may be loaded directly and executed by a hardware processor. In the latter, the intermediate representation is translated by a virtual machine or interpreter into machine code before execution by a hardware processor.

CAS repository 134 generates content addresses 130 based on file contents 128, such as by applying a cryptographic hash function as previously described. A content address is sometimes referred to as a content name or content identifier. A content address may be a bit-string or any other identifier that is linked to corresponding file content within CAS repository 134. In one or more embodiments, a hashed filename is used as the content address.

CAS repository 134 maintains address mapping layer 132, which is a data structure through which the content address may be resolved into a physical storage location. For example, address mapping layer 132 may comprise data that maps a hashed filename to a physical storage address where the linked file contents are stored. When a content address is accessed via CAS links 108, CAS repository 134 queries address mapping layer 132 for the physical storage address of the file contents. CAS repository 134 then retrieves the file contents and returns the clients to the requesting client. In some cases, a hash of the file contents may be recomputed and verified before the file contents are returned. If the recomputed hash value does not match the hash value in address mapping layer 132, then a flag may be raised.

Software updater 126 performs patching operations on software homes, such as software home 116. Additionally or alternatively, software updater 126 may perform rollback operations as further described herein. Software updater 126 generally comprises CAS loader 118, link manager 120, and interface 122.

In one or more embodiments, CAS loader 118 loads updated file contents to CAS repository 134 during patching operations. For example, a patching operation may include changes to one or more software binaries from which software deployments 102a-b are run. The modified software binaries may be provided to CAS repository 134, which generates a unique content address for the modified software binary based on a hash of the provided file contents.

Link manager 120 maintains CAS links 108 within software home 116 during patching and rollback operations. For example, link manager 120 may replace or otherwise modify hard links to point to a new content address that is linked to the updated file contents. If the patching operation encounters problems or the user would like to rollback to a previous state, then link manager 120 may restore a hard link to point to the content address where the original file contents (i.e., the file contents before the patch operation) are stored.

Interface 124 provides an interface through which users may control and view the status of patching operations. For example, a user may initiate a new patch operation on one or more software homes, perform rollback operations, view the status of each operation, and perform any other of the interactions described herein. A "user" in this context may be a human user or another application.

In one or more embodiments, interface 124 refers to hardware and/or software configured to facilitate communications between a user and software updater 126. Interface 124 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 124 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 124 is specified in one or more other languages, such as Java, C, or C++.

3.0 Patch Operations Using Content Addressable Storage

The software binaries from which software deployments 102a-b are run may be updated during patching operations. A patching operation may modify the machine code or bytecode of a source binary file to fix bugs, address security vulnerabilities, improve usability/performance, add new features, or otherwise provide updated software. The number and types of patches that are applied may vary from one patching operation to the next. A patch may be deployed as an executable file/binary or may be deployed as source code. In the latter case, the patch may be compiled to a software binary before or during the patching operation.

A patch may rely on namespace 106 of software home 116 to identify which software binaries should be updated. For example, the patch may specify a file to update by referencing the directory path and filename conforming to namespace 106. As previously described, the filename is mapped by a CAS link to a corresponding content address in CAS repository 134. The patch does not need to reference or be aware of the content address for the file that is being updated.

In one or more embodiments, software updater 126 initiates patching operation to apply new patches to software home 116. A patching operation may include two phases: a first phase for staging the content of an updated binary file and a second phase for switching the software deployments to run from the updated binary file. During the staging phase, software deployments 102*a-b* may continue running using the pre-updated software binaries linked from software home 116. As the software deployments 102*a-b* are running, updated file contents are loaded into CAS repository 134 and a staging area is created which may reside within software home 116 or a separate shadow home. In one or more embodiments, the staging area is a temporary directory from which to apply patches. The staging area allows for a clean separation of content addressable storage and data residing outside CAS repository.

During the second phase, hard links in the software home are replaced or otherwise modified to point to the content address of the updated files. Software deployments 102*a-b* may be temporarily brought down during the hard link setup or may continue executing, depending on the implementation. More detailed operations for performing the first and second phase of a patching operation are provided in the subsections below.

3.1 Phase One: Staging

Figure 2A:
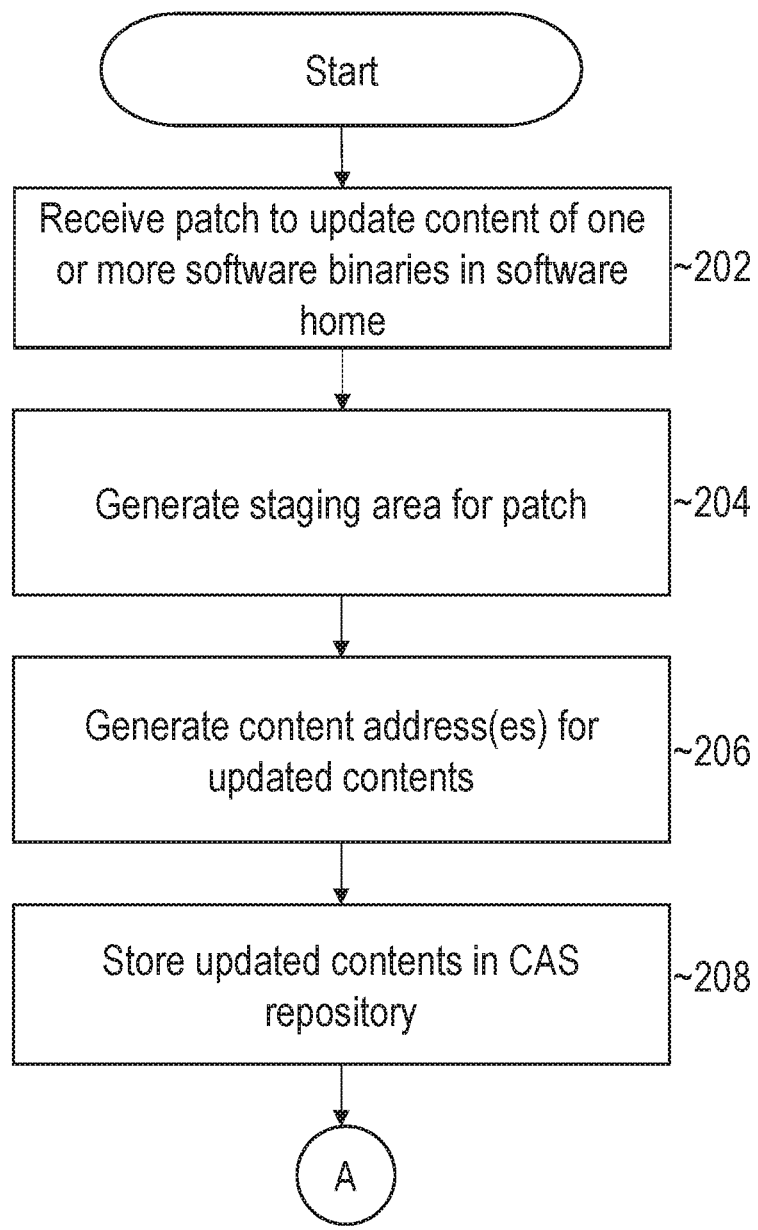
FIG. 2A illustrates an example set of operations for performing a first phase of a patching operation on a software home in accordance with one or more embodiments.

FIG. 2A illustrates an example set of operations for performing a first phase of a patching operation on a software home in accordance with one or more embodiments. One or more operations illustrated in FIG. 2A and the other flow diagrams illustrated herein may be modified, rearranged, or omitted all together. Accordingly, the particular sequence of operations illustrated in the figures should not be construed as limiting the scope of one or more embodiments.

In one or more embodiments, the patching operation includes receiving a patch to update the content of one or more software binaries in software home 116 (Operation 202). The source of the patch may vary from implementation to implementation. For example, the patch may be included in a patch set update supplied by a software provider/vendor and downloaded via the Internet. As another example, the patch may be a custom patch created and deployed directly by a user.

In one or more embodiments, the patching operation includes generating a staging area for the patch. (Operation 204). The staging area may store the patch contents and metadata information about the patch. The patch contents may include the updated file binaries, such as the machine code or bytecode to add to software home 116. The metadata information may identify where the updated software binaries should be installed in software home 116, the file size of the updated software binaries, patch identifiers (e.g., software/patch version number, names, etc.) and/or other patch information.

In one or more embodiments, the staging area allows one or more operations to be performed on the patch before it is fully applied to software home 116. For example, the patch contents may be scanned for malicious code. As another example, validation and verification operations may be performed on the patch to determine whether the patch satisfies design specifications, performance parameters and/or other conditions imposed on updates. These operations may help prevent security lapses, errors, and performance degradation caused by corrupt or suboptimal patches. If a violation is detected, then an error may be generated, and the patching operation may be aborted.

In one or more embodiments, the staging area is a shadow directory that conforms to namespace 106. For example, the shadow directory may mirror the subdirectory structures and filenames included in active directories in software home 116. An active directory refers to a directory from which the linked contents are being used to run software deployments 102*a-b*. By comparison, the file contents linked by a shadow directory are not active in the execution of software deployments 102*a-b*.

In one or more embodiments, the patching operation includes generating a content address for each updated file (Operation 206). For example, CAS repository 134 may apply a cryptographic hash function to the updated contents of a file to compute a hashed filename, which may be used as the content address. The cryptographic hash function may be applied to the new contents of each file that is being updated by the patch.

In one or more embodiments, the patching operation includes storing the updated contents in CAS repository 134 (Operation 208). CAS repository 134 may store the updated contents in available physical storage location such that the contents of the currently active version of the software binary are not overwritten. This allows software deployments 102*a-b* to continue executing from the pre-updated version of the software binary thereby preventing service disruptions. Also, the contents of CAS repository 134 do not need to be cloned, modified or otherwise copied during the patching operation to add the new contents.

In one or more embodiments, storing the updated contents in CAS repository 134 includes adding an entry to address mapping layer 132. The entry may include the content address for the updated contents and the physical storage address where the updated contents are stored. The content address, which may be the hash of the updated contents, may thus be used as the key to retrieve the updated software binary.

In one or more embodiments, software updater 126 manages the control flow of the patching operation. For example, software updater 126 may receive a request, via interface 124, to apply a particular patch to software home 116. In response, software updater 126 may generate the staging area, perform validation operations, and submit a request to CAS repository 134 to store the update file contents. Upon receiving the request, CAS repository 134 may generate the content address, update address mapping layer 132, and return the content address to software updater 126. Software updater 126 may store the content address in the staging area and use the content address as a hard link to the updated file contents.

Figure 3A:
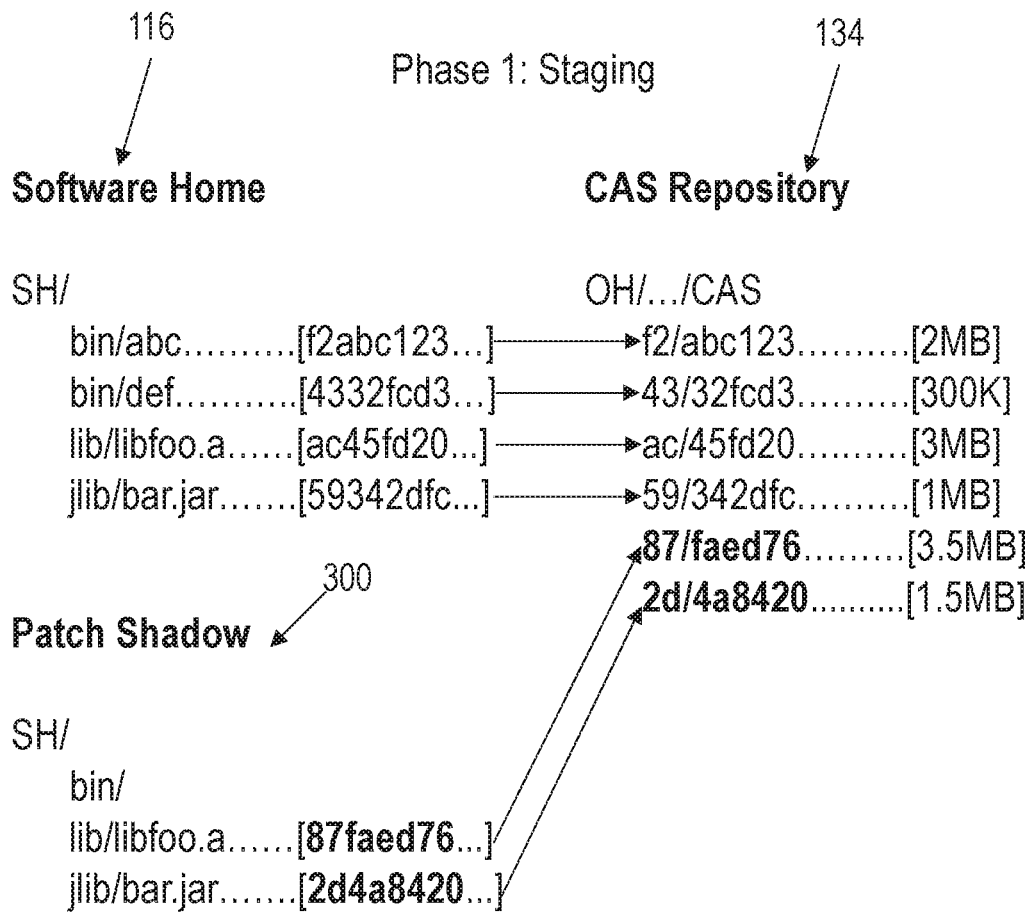
FIG. 3A illustrates an example system state after a first phase of a patching operation in accordance with one or more embodiments.

FIG. 3A illustrates an example system state after a first phase of a patching operation in accordance with one or more embodiments. Software home 116 include four different files with the following paths/filenames: SH/bin/abc; SH/bin/def; SH/lib/libfoo.a; and jlib/bar.jar. Each of these paths represents a filename that conforms to namespace 106 and is associated with a hard link that points to a content address (f2abc123, 4332fcd3, ac45fd20, and 59342dfc, respectively) in CAS repository 134.

During a patching operation, updates to SH/lib/libfoo.a and SH/jlib/bar.jar are received. Patch shadow 300 is generated as a staging area to store the patch contents and metadata. The updated patch contents are also loaded into CAS repository 134, which generates a corresponding content address for each of the updated software binaries. The content addresses are provided and stored in patch shadow 300 to link the filenames of namespace 106 to the contents in the content repository.

3.2 Phase Two: Updating the Software Home

Figure 2B:
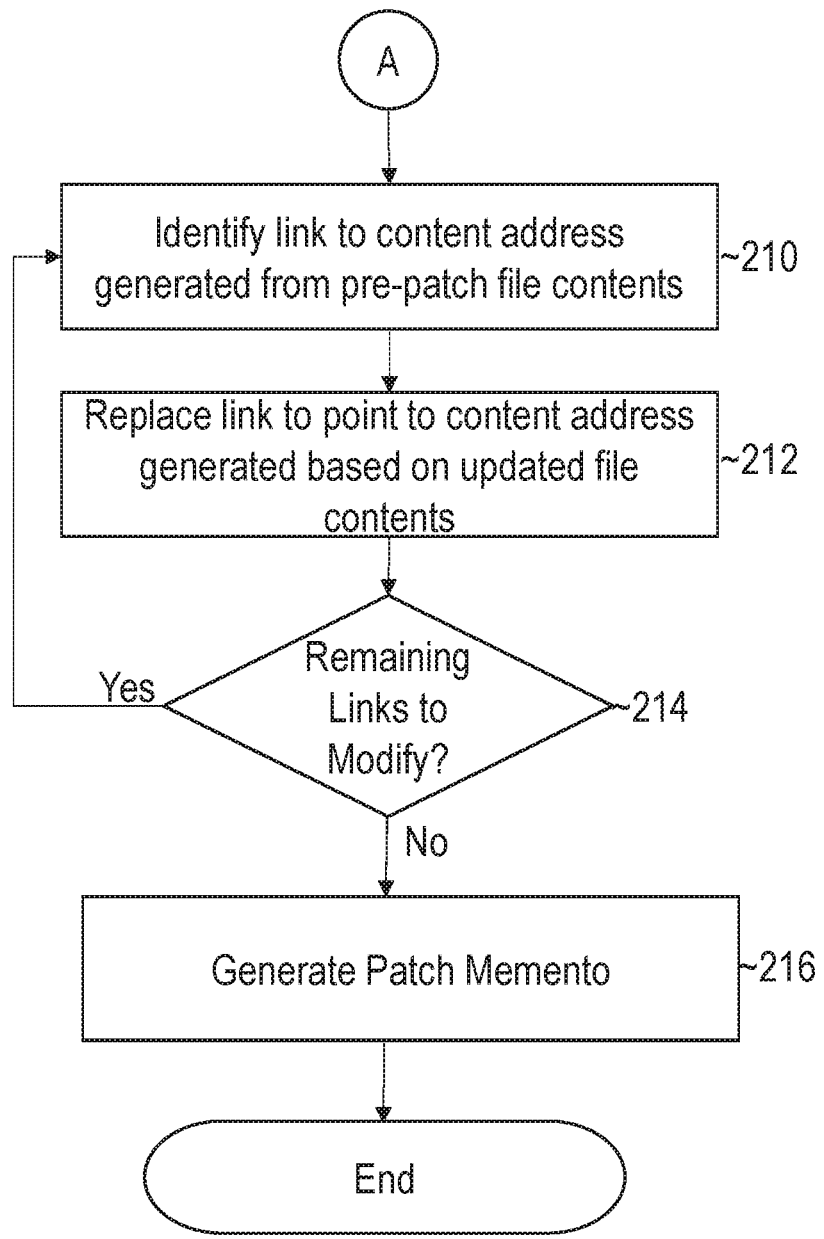
FIG. 2B illustrates an example set of operations for performing a second phase of a patching operation on a software home in accordance with one or more embodiments.

Once the staging phase is complete, software updater 126 may initiate the second phase of the patching operation. During this phase, the software binaries used to run software deployments 102a-b are switched to the updated versions. FIG. 2B illustrates an example set of operations for performing a second phase of a patching operation on a software home in accordance with one or more embodiments.

The patching operation includes identifying a link or a branch containing the link to the content address generated based on the pre-patch file contents (Operation 210). Referring to FIG. 3A, for example, the process may identify the corresponding links [ac45fd20] and [59342dfc] associated, respectively with files lib/libfoo.a and jlib/bar.jar in software home 116.

Referring again to FIG. 2B, the patching operation replaces the link to point to the content address based on the updated file contents (Operation 212). For example, referring to FIG. 3A, the link [ac45fd20] may be replaced with the link [87faed76], and the link [59342dfc] may be replaced with [2d4a8420].

The manner in which the links are replaced may vary from implementation to implementation. In one or more embodiments, the links within software home 116 may be overwritten with the links contained in patch shadow 300. For example, software updater 126 may compare the contents of patch shadow 300 with the contents of software home 116 to identify filenames/paths that match. Software updater 126 may then overwrite the hard links in software home 116 with the hard links from patch shadow 300.

Rather than overwriting the links in the software home, another approach is to cut branches from software home 116 and graft in branches from patch shadow 300. For example, the active directory "lib" that contains the hard link 87faed76 may be pruned from software home 116. The shadow directory "lib" from patch memento 302 may then be grafted to software home 116 (e.g., by updating the namespace metadata to point to the new directory), effectively replacing the hard links within the directory to point to the content addresses generated for the updated software binaries. The pruned branch may be used to generate a patch memento as described in further below.

The patching operation continues by determining whether there are any remaining links or branches to modify within software home 116 (Operation 214). If so, then the patching process returns to operation 210 and repeats for the next link/branch to be replaced. Once all the hard links have been updated, the patching operation proceeds to operation 216.

In one or more embodiments, the patching operation includes generating a patch memento (Operation 216). A patch memento includes the hard links that were replaced during the patching operation. The patch memento may be generated to preserve the state of software home 116. Patch mementos may be useful for performing a rollbacks and other operations as further described in Section 4.0, "Memento-Based Operations".

Figure 3B:
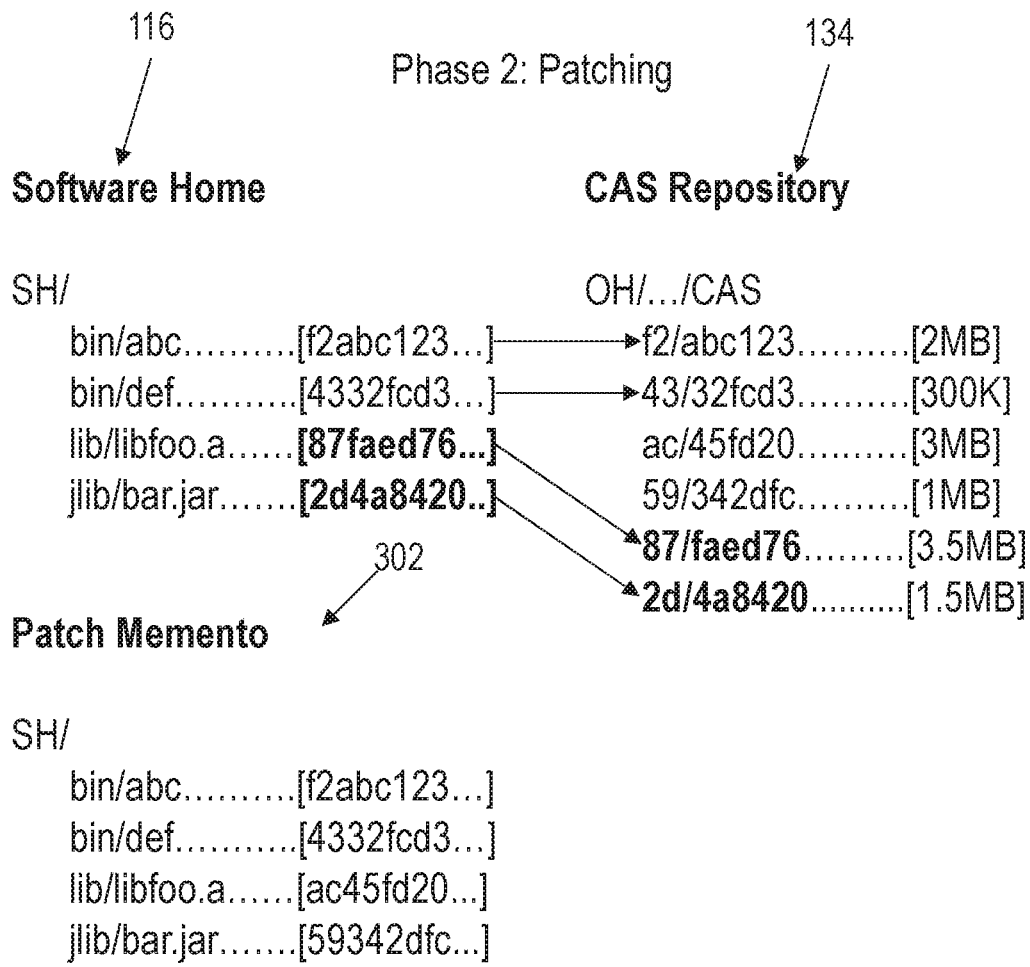
FIG. 3B illustrates an example system state after a second phase of a patching operation in accordance with one or more embodiments.

FIG. 3B illustrates an example system state after a second phase of a patching operation in accordance with one or more embodiments. The hard links previously assigned to lib/libfoo.a and jlib/bar.jar have been replaced with hard links that point to the content addresses of the new software binaries. References to these files (e.g., from software deployments 102a-b) are mapped to the new content address. CAS repository 134 maps the content address to the physical storage location of the updated file contents, which are returned to be loaded/executed by software deployments 102a-b during application runtime.

Patch memento 302 captures the state of software home 116 prior to the patch operation. Patch memento 302 maps the filenames of the software home to the links that were replaced as part of the patching operation. Patch memento 302 may be implemented as a shadow directory that is not used to actively run software deployments 102a-b.

4.0 Memento-Based Operations

Patch mementos may be generated to capture the state of software home 116 at various patch levels. For example, a first patch may be applied to software home 116 at time T1, a second patch at time T2, and a third patch at time T3. A patch memento may be created at each separate patch level: one to capture the state of software home 116 prior to T1, one to capture the state of software home 116 between T1 and T2, and one to capture the state of software home 116 between T2 and T3. Each patch memento includes a mapping between the filenames and the hard links to the content addresses associated with the particular state.

Patch mementos may point to the same content address for files that share the same content between different states. For example, bin/abc point in patch memento 302 points to the same content address as bin/abc in software home 116. This allows for the state of a software home to be preserved without copying files within CAS repository 134, thereby reducing the storage and processing overhead consumed for each new patch memento.

The number of patch mementos that are maintained may vary depending on the particular implementation. For example, a threshold may be exposed to and configured by an end user. If the user inputs a threshold number of zero or more, then the number of patch mementos that are maintained may match input threshold to capture a threshold number of states of software home 116. As additional patches are received and the threshold is exceeded, the oldest patch memento may be deleted, removing the hard links included therein.

In one or more embodiments, CAS repository 134 maintains patch memento information in address mapping layer 132. For example, address mapping layer 132 may include a memento name mapping layer that has metadata and data structures capturing the atomicity of filenames and the corresponding versions to a patch operation. CAS repository 134 may use the memento name mappings to provide a namespace view of a software home that is associated with a particular patch memento. The namespace view associated with a patch memento may be populated with files in a directory structure to instantiate the state associated with the patch memento. New patches may be applied to CAS repository 134 without affecting the existing views of patch mementos.

Figure 4:
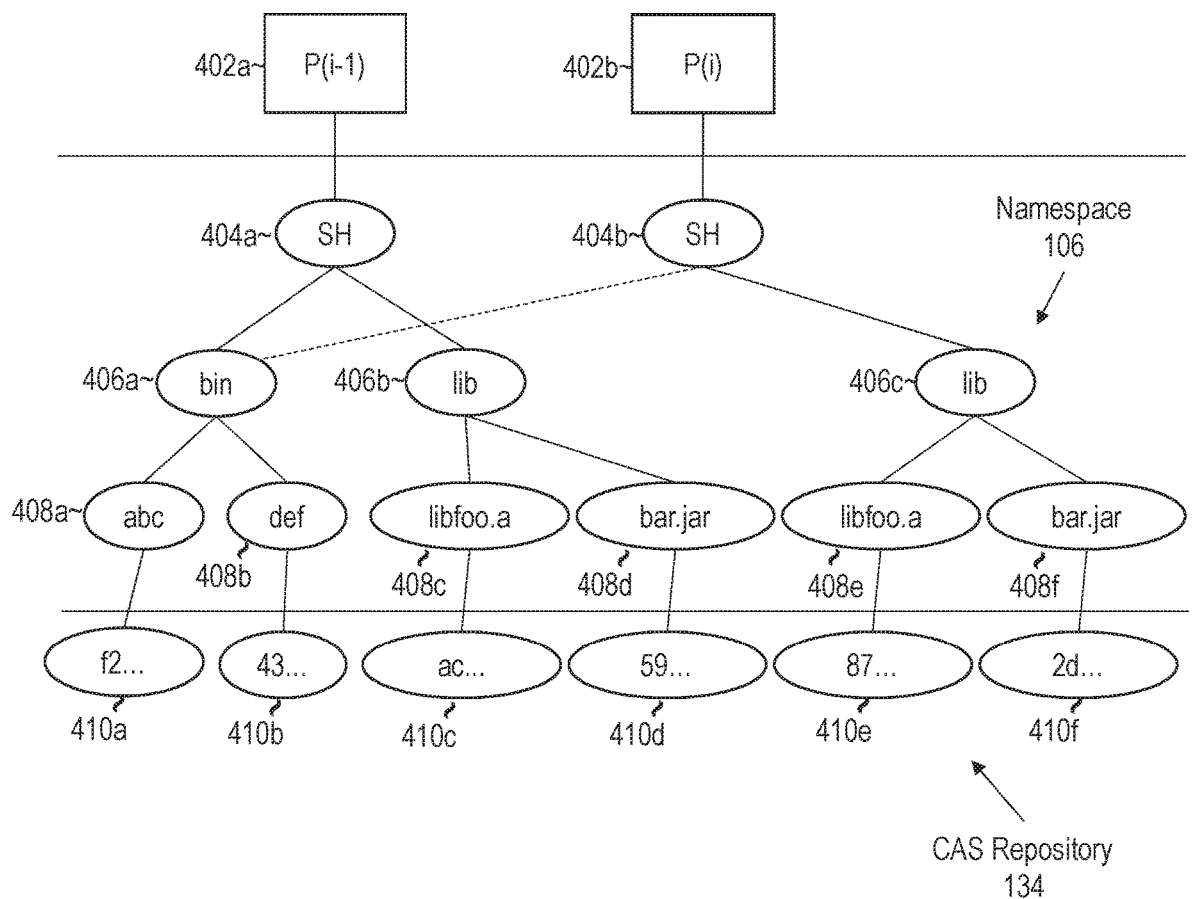
FIG. 4 illustrates an example set of mappings between a software home namespace and content addressable storage for two different states, in accordance with one or more embodiments.

FIG. 4 illustrates an example set of mappings between a software home namespace and content addressable storage for two different states, in accordance with one or more embodiments. Patch memento 402b captures the current state/patch level, denoted P(i), of software home 116. Patch memento 402a captures the previous state/patch level, denoted P(i−1), of software home 116.

Namespace 106 depicts that directories and filenames that are mapped to each patch memento. At the top-level, patch memento 402a-b include directories 404a-b, respectively. Each of these directories includes two subdirectories. Directory 404a is linked to subdirectories 406a and 406b, and directory 404b is linked to subdirectories 406a and 406c. As can be seen, the top-level directories share subdirectory 406*a* as the file contents in this directory were not updated during the patching operation. Thus, both patch mementos point to the same content addresses for these files. Subdirectory 406*b* may be pruned and subdirectory 406*c* grafted to the software home during patching operations such as previously described. The lowest level of namespace 106 includes filenames 408*a*-*f*, which store hard links to CAS repository 134.

CAS repository 134 includes content addresses 410*a*-*f*. Each of these content addresses are generated by hashing the file contents of a linked file. For example, content address 410*c* is generated based on the file contents libfoo.a as they existed in the state captured by patch memento 402*a*. Content address 410*e* is generated based on the updated file contents of libfoo.a as they existed in the state captured by patch memento 402*b*.

4.1 Rolling Back Software Homes to Previous States

In one or more embodiments, software updater 126 is configured to perform rollback operations using patch mementos. For example, software updater 126 may determine the hard links mapped to namespace 106 of software home 116 at a previous patch level from the patch mementos. Software updater 126 may then restore the links as they existed at the desired rollback state.

Figure 5:
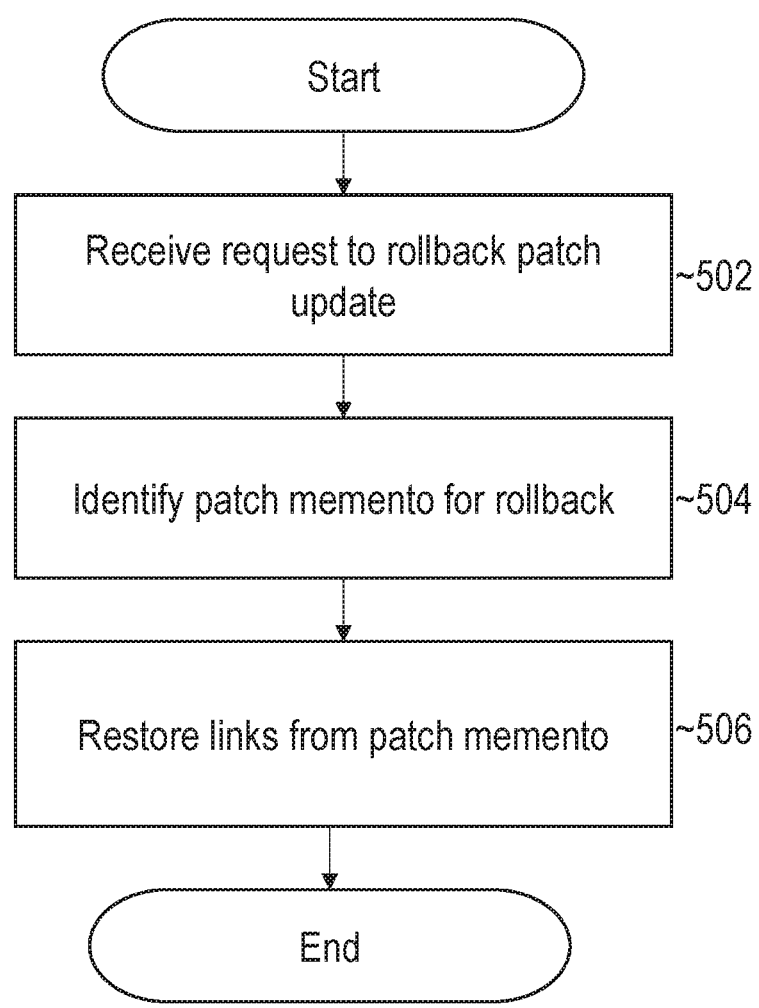
FIG. 5 illustrates an example set of operations for performing a rollback operation in accordance with one or more embodiments.

FIG. 5 illustrates an example set of operations for performing a rollback operation in accordance with one or more embodiments. The set of operations include receiving a request to rollback a patch update (Operation 502). For example, a user may submit a request to software updater 126 to return to a state to a previous state.

Responsive to receiving the request, the rollback operation identifies a patch memento to use (Operation 504). The patch memento may be identified based on information explicitly included in the request or determined implicitly. For example, a user may specify a time or patch version to which the system should rollback. This information may be mapped to patch memento metadata to determine which patch memento to use. If such information is not included in the request, the system may default to the previous state/patch level, and select the corresponding patch memento.

The rollback operation further includes restoring the links included in the identified patch memento (Operation 506). In order to restore the links, the links in the active software home may be overwritten or the branches that are different may be replaced via grafting as previously described. Alternatively, the shadow directory captured by the patch memento may be changed to the active directory. Referring to FIG. 4, for example, responsive to a request to rollback to patch level P(i–1), the directory 404*a* may become the active directory to restore the links to content addresses 410*c* and 410*d*.

The rollback operation summarized above may be performed without copying, cloning, or otherwise moving file contents stored in CAS repository 134. By restoring the hard links to the content addresses, software deployments 102*a*-*b* may revert to executing from the previous software binaries, which did not change physical storage locations. As hard links are typically very small and much smaller than the underlying file contents, rollback operations may be performed extremely quickly. Due to the speed with which hard links may be replaced, both patching and rollback operations may be performed during application runtime without the need to bring down servers, thereby maintaining continuity of service.

4.2 Garbage Collection within Content Addressable Storage

In one or more embodiments, patch mementos are used to perform garbage collection operations within CAS repository 134. Garbage collection operations help reclaim storage space within CAS repository 134 by removing/deleting source binaries that are no longer being used or referenced. Once the space has been reclaimed, new software binaries may be stored at physical storage location as new patches are received. Even though the new software binaries are stored at the same physical storage location, a different content address may be assigned depending on the hash of the contents.

Figure 6:
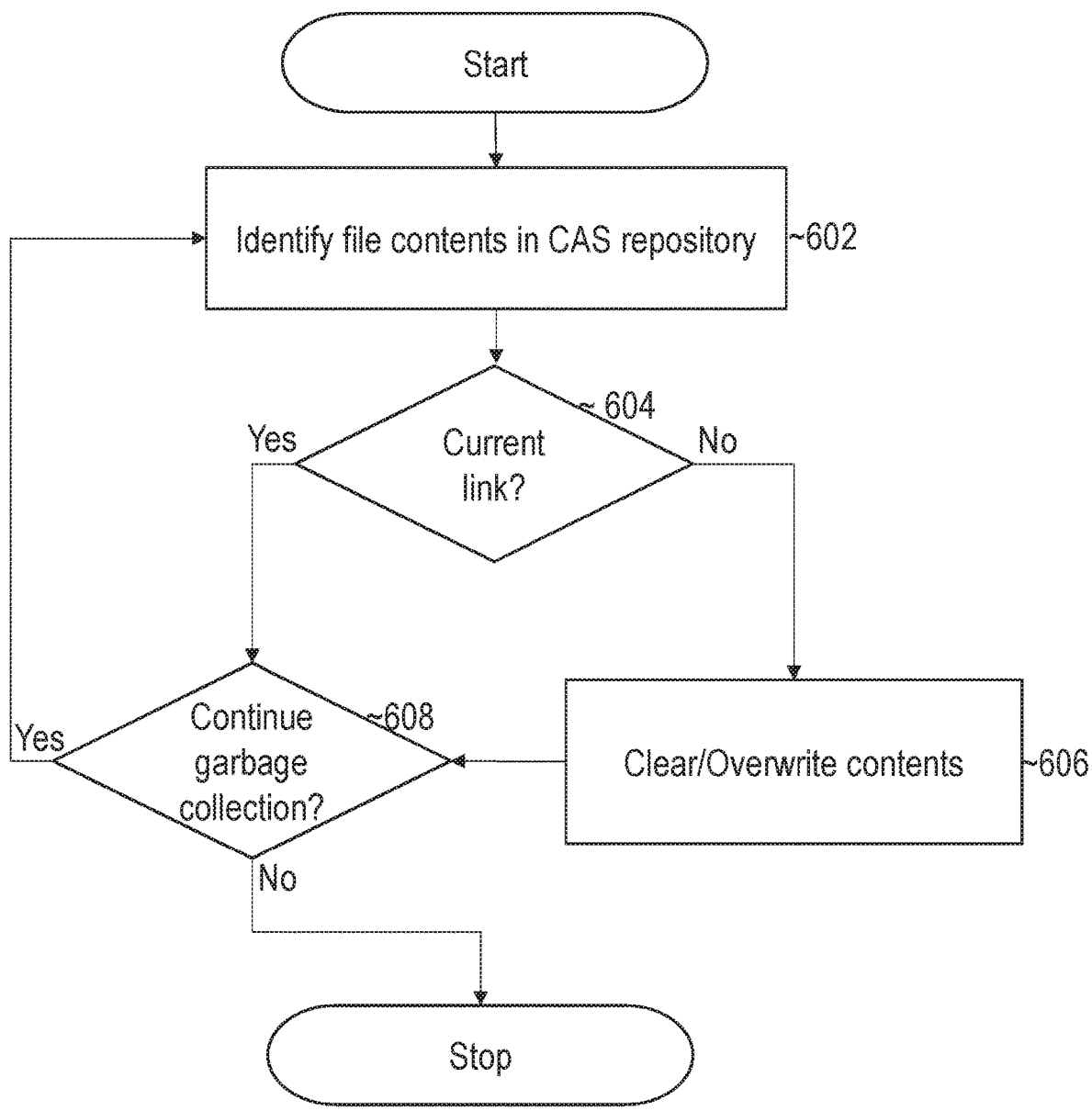
FIG. 6 illustrates an example set of operations for performing a garbage collection within content addressable storage, in accordance with one or more embodiments.

FIG. 6 illustrates an example set of operations for performing a garbage collection within content addressable storage, in accordance with one or more embodiments. The garbage collection operation scans CAS repository 134 to identify a set of file contents (Operation 602). For example, the garbage collector may perform a sequential scan of the mapped physical storage locations or may perform the scan in any other manner.

The garbage collection operation further includes determining whether there is a current links to the file contents (Operation 604). A link is considered current if included in a patch memento that has not yet been deleted or an active software home. If a patch memento has been deleted, one or more of the hard links included therein may also be included in a different patch memento and/or active home. Therefore, removing the patch memento may not result in removing all linked file contents from CAS repository 134.

In one or more embodiments, the garbage collector may scan the memento name mapping layer in CAS repository 134 to determine if a link to the content exists. The memento name mapping layer may include mappings for all current patch mementos and active homes. If none of the mappings reference a particular content entry, then the garbage collector may mark the contents for deletion.

In one or more embodiments, the garbage collection operation includes clearing or overwriting contents that do not have any current links (Operation 606). For example, the physical storage space may be reclaimed by setting a flag and/or removing pointers such as the corresponding content address mapping. As new file contents are received, the physical storage space may be used to store the new contents. A new content address may then be assigned, and the mapping tables updated within CAS repository 134.

In one or more embodiments, the set of operations includes determining whether to continue garbage collection (Operation 608). Garbage collection may be performed continuously, periodically, at scheduled times, on demand, or according to any other timeframe. The process may return to operation 602 and continue to scan the file contents of CAS repository 134 according to the timeframe.

5.0 Additional Software Home Characteristics Using Content Addressable Storage Mapping the namespace of software homes to content addressable storage may performed to provide other optimizations in addition or as an alternative to those previously described. These advantages include reducing storage overhead by providing for file de-duplication across multiple software homes and reducing processing overhead when performing software validations and comparison operations. These advantages are described in more detail in the subsections below.

5.1 File De-Duplication for Multiple Software Homes

In one or more embodiments, multiple software homes map filenames to the same content address in CAS repository 134. For example, two or more software homes may both be run using the same software binary. Instead of maintaining separate copies of the software binaries in different directories/software homes, the different software homes may store a hard link that points to the same content address generated from a hash of the file contents. Thus, a single copy of the software binary may be maintained in CAS repository 134 across multiple homes.

The software homes that point to the same content address may be run from the same set of source components or may be run from different components. For example, one software deployment may be configured to run from a software home at patch level P(i). Another software deployment may continue to be executed from the software home at patch level P(i−1) due to staggered updates, user preferences, or any other reason. Both software homes run from the same version of bin/abc, which is mapped to the content address [f2abc123], and bin/def, mapped to content address [4332fcd3]. However, the files lib/libfoo.a and jlib/bar.jar are mapped to different content addresses generated from different versions of the file contents.

By separating the namespace of a software home from the content layer, a large number of software variations may be maintained with relatively low storage overhead and processing overhead. Duplicate files do not need to be replicated and stored in each different version of a software home as the namespace directories do not directly store the file contents, but rather hard links to the content address layer.

5.2 Software Home Validation and Comparison

The use of CAS repository 134 also allows for different software homes to be efficiently compared and validated. As previously described, the content addresses may be generated by hashing the file contents for files that are linked from software home 116. These hash values/content addresses may be compared to determine which file contents are shared between different software homes. As the hash values are pre-computed, the validation operation does not need to rehash the files to perform the comparison.

In one or more embodiments, hash values may also be maintained at the directory level of namespace 103. Referring to FIG. 4, for example, an aggregate hash value may be maintained for subdirectory 406a based on the content addresses mapped to the linked filenames "abc" and "def". Similarly, an aggregate hash value may be maintained for directory 406b based on the content addresses mapped to "libfoo.a" and "bar.jar". At the top-level, an aggregate hash value may be assigned to directory 404a by aggregating the aggregate hash values of subdirectories 406a and 406b.

The manner in which an aggregate hash value is computed may vary from implementation to implementation. As one example, the hash values may be concatenated. As another example, a hash function may be applied to the combined hash values. The aggregate hash value for one directory may be compared to the aggregate hash value of a different directory to determine whether the directories map to the same file contents or not.

Figure 7:
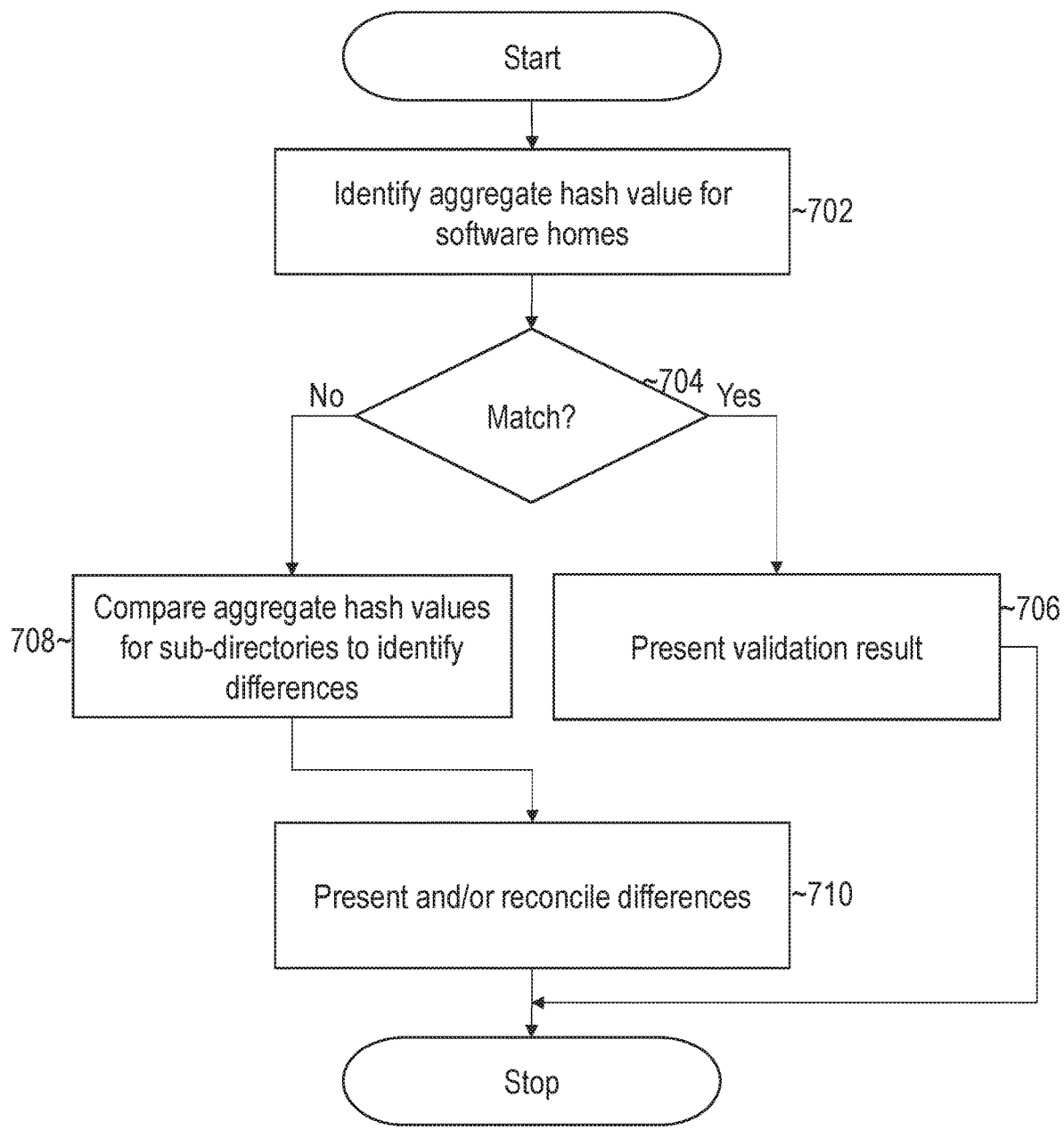
FIG. 7 illustrates an example set of operations for comparing the state of two different software homes in accordance with one or more embodiments.

FIG. 7 illustrates an example set of operations for comparing the state of two different software homes in accordance with one or more embodiments. The validation operation includes identifying the aggregate hash values for two or more different software homes. (Operation 702). As indicated above, the aggregate hash value for a software home is generated as a function of the content addresses linked to the software home's namespace.

The set of operations includes comparing the hash values to determine whether the values match (Operation 704). If the hash values do not match the software homes do not map to the same file, then the process may immediately present the validation result and/or continue to operation 706, described further below, to determine how the software homes differ.

If the values match, then the software homes map to the same content addresses/file contents and may be considered the same/validated. The validation result may be displayed, returned, or otherwise presented to a user to indicate that the software homes match. (Operation 706).

In one or more embodiments, the validation operation compares aggregate hash values for subdirectories in the software homes to identify which subdirectories differ (Operation 708). For example, all or a subset of subdirectories may have a differing hash values resulting in the Additionally or alternatively, the validation operation may compare individual hard links within differing directories to determine which files map to different file contents.

In one or more embodiments, the validation operation presents and/or reconciles differences between the software homes (Operation 710). For example, the links to the content address layer of one software home may be replaced with the links from the other software home. Additionally or alternatively, a report may be generated that shows which branches of the namespace and filenames differ between the software homes. The report may be used to pinpoint the exact source binaries that differ between software deployments.

6.0 Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7.0 Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
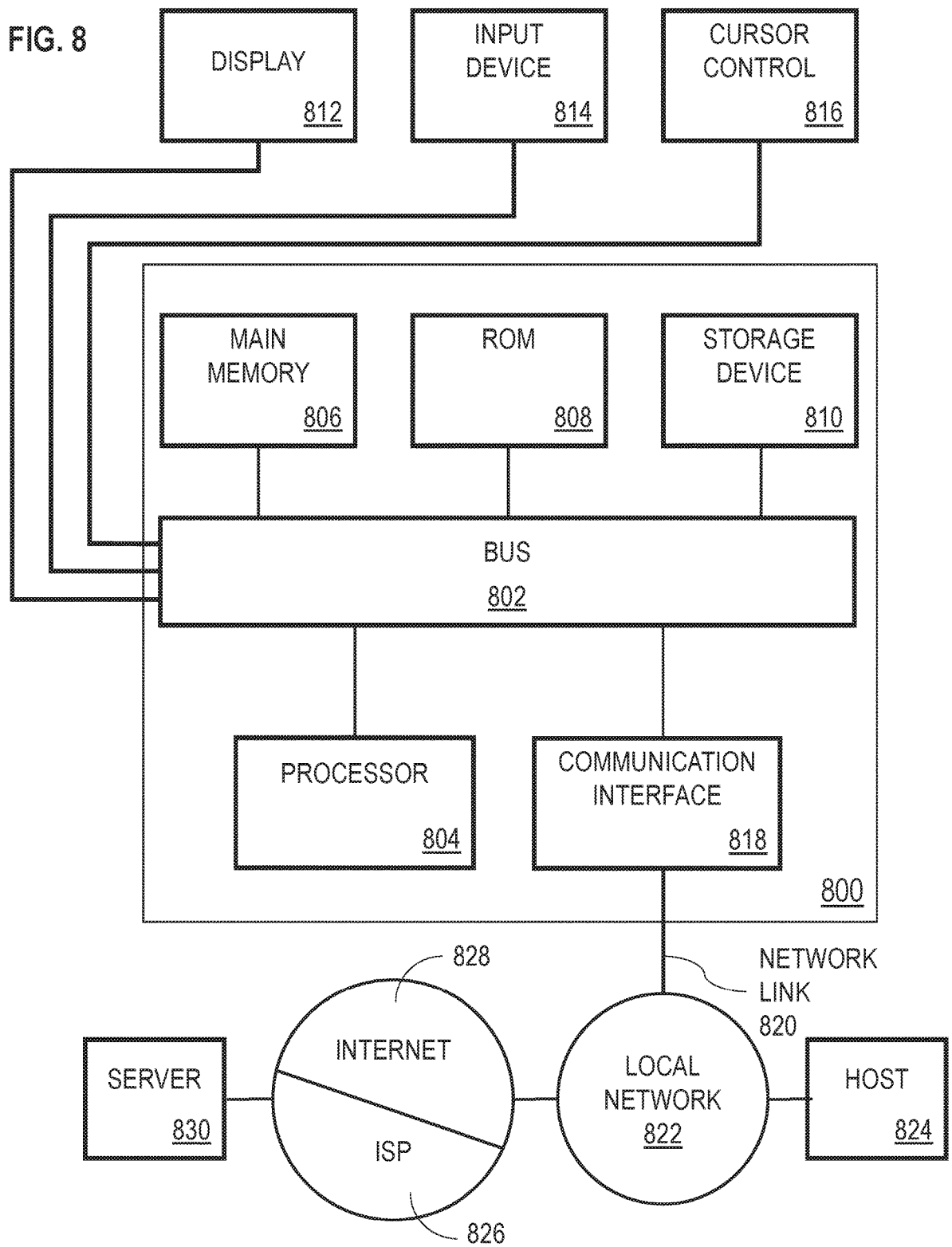
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

9.0 Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing content for a file that is used to run a particular software deployment, wherein the file is associated with a particular directory that includes a link to a first filename generated as a function of the content for the file;
   receiving updated content for the file;
   responsive to receiving the updated content for the file, generating a second filename as a function of the updated content, wherein the second filename is different than the first filename;
   modifying the link included in the particular directory to point to the second filename, wherein after modifying the link included in the particular directory to point to the second filename, the updated content for the file is used to run the particular software deployment;
   generating a patch memento that stores a set of one or more links including the link to the first filename; and
   returning the particular software deployment to a previous state using the patch memento, wherein returning the particular software deployment to the previous state using the patch memento comprises modifying the link in the particular directory to point to the first filename.

2. The method of claim 1, wherein the first filename is mapped to a first location in a content addressable storage repository and wherein the second filename is mapped to a second location in the content addressable storage repository.

3. The method of claim 2, wherein the updated contents are stored at the second location in the content addressable storage repository without modifying the contents of the file at the first location in the content addressable storage repository and while the particular software deployment continues to run from the content for the file.

4. The method of claim 1, wherein the first filename is generated by applying a cryptographic hash function to the content for the file; wherein the second filename is generated by applying the cryptographic hash function to the updated contents for the file.

5. The method of claim 1, wherein the link maps a filename of a namespace of a software home including the particular directory to the first filename before the link is modified and to the second filename after the link is modified.

6. The method of claim 1, wherein the updated content for the file includes an updated software binary.

7. The method of claim 1, wherein the particular directory is included in a first software home of a plurality of software homes from which different software deployments are run; wherein the plurality of software homes includes a second software home; wherein the second software home is associated with a second file that shares identical contents with the first file before receiving the updated content, wherein the second software home includes a second directory; wherein the second directory includes a link for the second file that points to the first filename.

8. The method of claim 1, wherein the particular directory is a first directory of a plurality of directories included in a particular software home, the method further comprising storing a plurality of hash values for a plurality of directories; wherein the hash value for the first directory is determined as a function of the updated contents for the file and contents for at least one other file associated with the particular directory.

9. The method of claim 8, further comprising identifying differences between the particular software home and a second software home based on a comparison of at least one hash value of the plurality of hash values with a second set of one or more hash values associated with the second software home.

10. One or more non-transitory computer-readable media storing instructions, which, when executed by one or more hardware processors, cause operations comprising:
    storing content for a file that is used to run a particular software deployment, wherein the file is associated with a particular directory that includes a link to a first filename generated as a function of the content for the file;
    receiving updated content for the file;
    responsive to receiving the updated content for the file, generating a second filename as a function of the updated content, wherein the second filename is different than the first filename;
    modifying the link included in the particular directory to point to the second filename, wherein after modifying the link included in the particular directory to point to the second filename, the updated content for the file is used to run the particular software deployment;
    generating a patch memento that stores a set of one or more links including the link to the first filename; and
    returning the particular software deployment to a previous state using the patch memento, wherein returning the particular software deployment to the previous state using the patch memento comprises modifying the link in the particular directory to point to the first filename.

11. The one or more non-transitory computer-readable media of claim 10, wherein the first filename is mapped to a first location in a content addressable storage repository and wherein the second filename is mapped to a second location in the content addressable storage repository.

12. The one or more non-transitory computer-readable media of claim 11, wherein the updated contents are stored at the second location in the content addressable storage repository without modifying the contents of the file at the first location in the content addressable storage repository and while the particular software deployment continues to run from the content for the file.

13. The one or more non-transitory computer-readable media of claim 10, wherein the first filename is generated by applying a cryptographic hash function to the content for the file; wherein the second filename is generated by applying the cryptographic hash function to the updated contents for the file.

14. The one or more non-transitory computer-readable media of claim 10, wherein the link maps a filename of a namespace of a software home including the particular directory to the first filename before the link is modified and to the second filename after the link is modified.

15. The one or more non-transitory computer-readable media of claim 10, wherein the updated content for the file includes an updated software binary.

16. The one or more non-transitory computer-readable media of claim 10, wherein the particular directory is included in a first software home of a plurality of software homes from which different software deployments are run; wherein the plurality of software homes includes a second software home; wherein the second software home is associated with a second file that shares identical contents with the first file before receiving the updated content, wherein the second software home includes a second directory; wherein the second directory includes a link for the second file that points to the first filename.

17. The one or more non-transitory computer-readable media of claim 10, wherein the particular directory is a first directory of a plurality of directories included in a particular software home, the operations further comprising storing a plurality of hash values for a plurality of directories; wherein the hash value for the first directory is determined as a function of the updated contents for the file and contents for at least one other file associated with the particular directory.

18. The one or more non-transitory computer-readable media of claim 17, further comprising identifying differences between the particular software home and a second software home based on a comparison of at least one hash value of the plurality of hash values with a second set of one or more hash values associated with the second software home.

19. A system comprising:
one or more hardware processors; and
one or more non-transitory computer-readable media storing instructions, which, when executed by the one or more hardware processors, cause:
storing content for a file that is used to run a particular software deployment, wherein the file is associated with a particular directory that includes a link to a first filename generated as a function of the content for the file;
receiving updated content for the file;
responsive to receiving the updated content for the file, generating a second filename as a function of the updated content, wherein the second filename is different than the first filename;
modifying the link included in the particular directory to point to the second filename, wherein after modifying the link included in the particular directory to point to the second filename, the updated content for the file is used to run the particular software deployment;
generating a patch memento that stores a set of one or more links including the link to the first filename; and
returning the particular software deployment to a previous state using the patch memento, wherein returning the particular software deployment to the previous state using the patch memento comprises modifying the link in the particular directory to point to the first filename.

* * * * *